(12) United States Patent
Both et al.

(10) Patent No.: US 6,312,504 B1
(45) Date of Patent: Nov. 6, 2001

(54) ROTARY WASHER WITH OBLIQUELY POSITIONED DEMISTER

(75) Inventors: Reinhold Both, Gelsenkirchen; Christian Haubold, Gladbeck, both of (DE)

(73) Assignee: CFT Gmbh Compact Filter Technic, Gladback (DE)

(*) Notice: Subject to any disclaimer, the term of this patent is extended or adjusted under 35 U.S.C. 154(b) by 0 days.

(21) Appl. No.: 09/428,920

(22) Filed: Oct. 28, 1999

(30) Foreign Application Priority Data

Nov. 18, 1998 (DE) .............................. 198 53 190

(51) Int. Cl.[7] ............................................... B01D 47/06
(52) U.S. Cl. ........................ 95/214; 55/385.5; 95/215; 95/216; 95/225; 95/228; 96/356; 96/358; 96/361
(58) Field of Search ............................ 55/385.5; 95/212, 95/281, 214, 215, 216, 217, 221, 222, 224, 225, 228; 96/233, 281, 282, 311, 315, 355, 356, 357, 358, 361, 363, 364

(56) References Cited

U.S. PATENT DOCUMENTS

| | | | |
|---|---|---|---|
| 700,859 | * 5/1902 | Thomas | 96/358 |
| 885,185 | * 4/1908 | Serrell | 96/358 |
| 1,222,541 | * 4/1917 | Donham | 96/356 |
| 1,966,280 | * 7/1934 | Bingham | 96/357 |
| 2,213,911 | * 9/1940 | Highhouse | 96/358 |
| 2,217,130 | * 10/1940 | Niehart | 96/356 |
| 3,006,436 | * 10/1961 | Starbuck et al. | 96/356 |
| 3,325,973 | * 6/1967 | Illingworth | 95/214 |
| 3,444,670 | * 5/1969 | Hungate | 96/356 |
| 3,686,833 | * 8/1972 | Rush | 96/361 |
| 3,795,089 | * 3/1974 | Reither | 96/356 |
| 3,888,642 | * 6/1975 | Toyama | 96/361 |
| 4,140,501 | * 2/1979 | Ekman | 96/356 |
| 4,380,353 | * 4/1983 | Campbell et al. | 55/385.5 |
| 4,787,920 | * 11/1988 | Richard | 95/214 |
| 5,300,131 | * 4/1994 | Richard | 96/356 |

\* cited by examiner

*Primary Examiner*—Duane S. Smith
(74) *Attorney, Agent, or Firm*—James Creighton Wray; Meera P. Narasimhan

(57) ABSTRACT

For purifying dust-containing air, particularly in underground mining and tunnel construction, a dust separator 1 in the form of a rotary washer 1 is proposed. The drive 5 of said rotary washer 1 is equipped with a gear unit 10 in order to enable long-term operation with a straight characteristic. Furthermore, disposed downstream of the fan impeller 6 is a special separating element 11 in the form of a demister 20, which is disposed so as to be suspended approximately horizontally in the air stream. Clogging of the demister 20 is therefore effectively prevented and so uniform and reliable operation is guaranteed. The demister 20 together with its associated jetwashing device 22 may be swivelled by a positioning motor 23 into an, in each case, optimum position.

21 Claims, 2 Drawing Sheets

ROTARY WASHER WITH OBLIQUELY POSITIONED DEMISTER

BACKGROUND OF THE INVENTION

Figure 1:
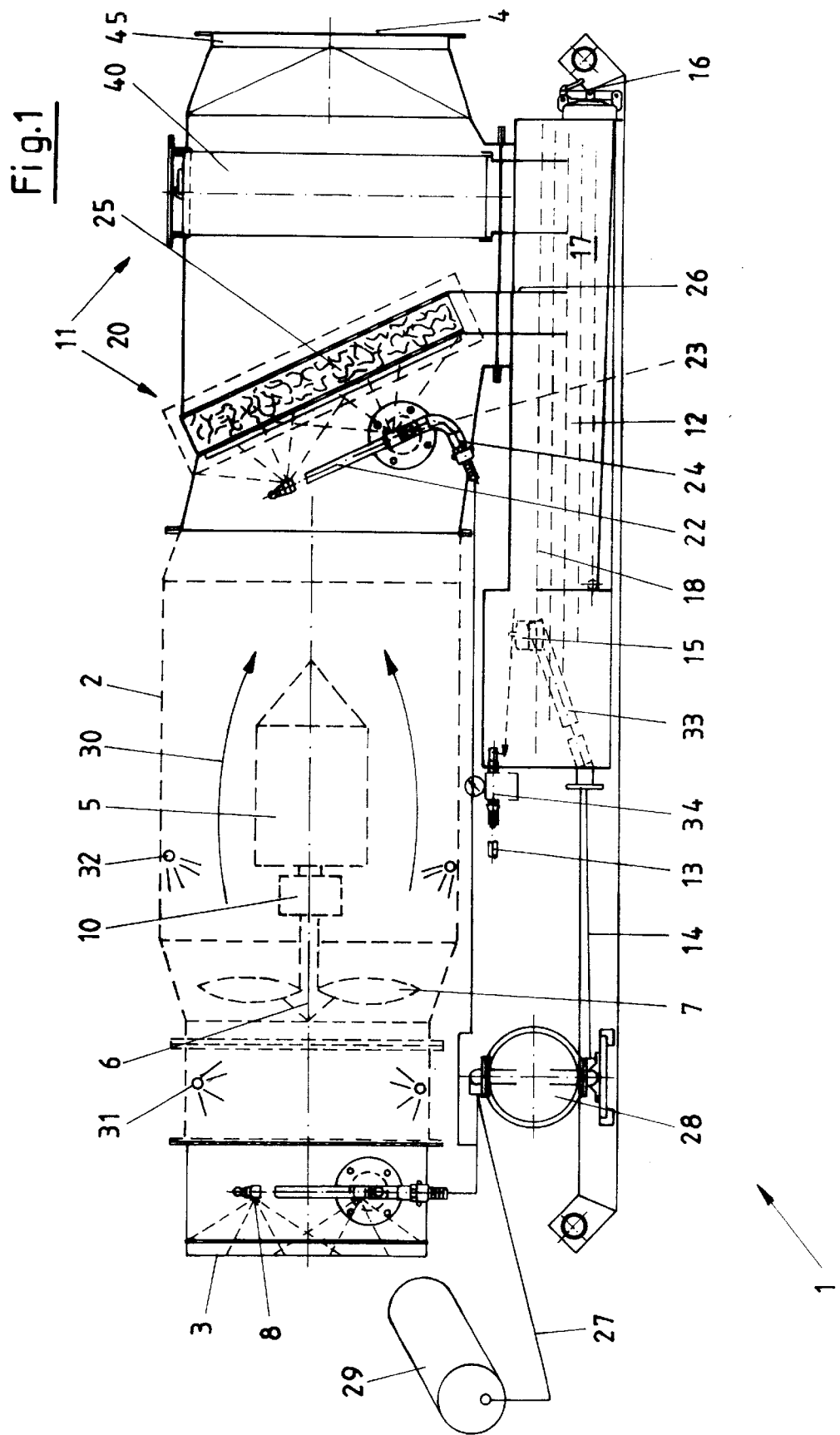
Figure 2:
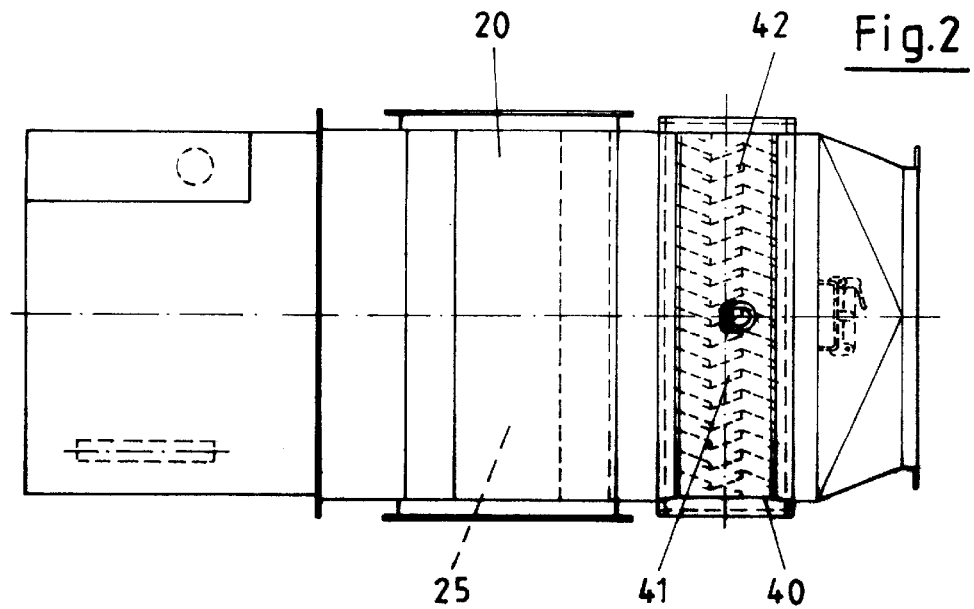
Figure 3:
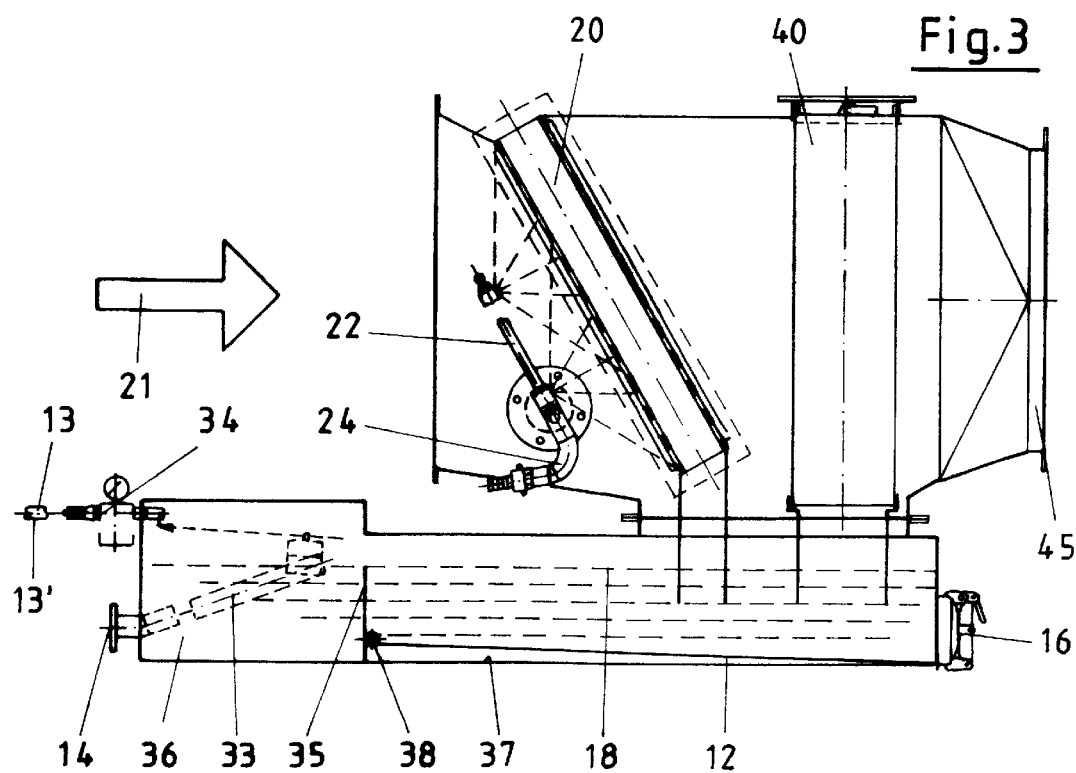

The invention relates to a dust separator for use with dust-generating machines and/or plant for use in underground mining and tunnel construction, comprising a drive acting upon a fan impeller and disposed at the inlet side of the washer housing, inlet-side water nozzles and the separating elements for the dust-containing water, which are disposed at the outlet side, as well as a water tank with a valve-controlled water inlet and water outlet as well as a drain valve for the sludge.

In underground mining as well as in other branches of industry, dust separators are used to separate, in particular, respirable dust from the ambient air and deposit it in a safe place. So-called dry dust separators are known, in which the dust is conveyed through filter elements and so the dust is removed, wherein the filters equipped with a suitable filter cloth are dedusted at regular intervals in order to ensure a long service life of such filters. Apart from the fact that such dust separators are relatively large, it is a disadvantage that they have to be cleaned at specific intervals. For said purpose so-called rotary or wet washers are used, whereby the air containing dust is sucked, by means of a fan impeller operating in the air stream, into the washer housing before being loaded with finely distributed water and separated from said dust-containing water in downstream separating elements. The problem here is keeping the discharging clean air dry because, particularly in underground mining, moist air in turn poses additional problems.

SUMMARY OF THE INVENTION

The object of the invention is therefore to provide a powerful wet dust separator having a stable characteristic as well as a high dust separation and moisture separation efficiency.

The object is achieved according to the invention in that a gear unit is associated with the drive of the fan impeller acted upon by the mixture of air, dust and water, and that the separating elements comprise a demister, which is positioned so as to be inclined until approximately horizontal in the air stream.

Given a dust separator constructed in said manner, wet dust separation is advantageously effected without operation being hindered by the problems arising with previous wet dust separators. In particular, the gear unit ensures that the dust separator operates virtually independently of the dust and water content and/or independently of the quantity. The gear unit ensures uniform operation and hence a stable characteristic, which in turn also contributes towards uniformly clean air being discharged from the dust separator independently of the dust and water content and/or independently of the quantity. By virtue of the fact that the separating elements, i.e. here, in particular, the demister, are disposed so as to be inclined until approximately horizontal in the air stream, optimum dewatering of the air stream is ensured, wherein further units disposed downstream may additionally contribute towards an approximately dry air stream leaving the dust separator. It is moreover advantageous that, by virtue of the special arrangement of the demister, clogging of said unit may be avoided because the sludge-containing water continuously drips downwards and may be removed.

According to an advantageous embodiment of the invention, it is provided that a jetwashing device is disposed upstream of the demister. By means of said jetwashing device the demister may be cleaned at regular intervals to ensure that its separation efficiency is also in an optimum range in each case. There is moreover also the possibility of using the jetwashing device to bond yet more dust particles or the residual dust particles with the water shortly before entry into the demister in order also to ensure that all dust particles are actually consolidated and may drain into the water tank.

According to the present invention, the demister is to be disposed as horizontally as possible in the air stream. Depending on the dust content and/or the nature of the dust, it may be advantageous to vary the inclination of the demister. It is therefore particularly advantageous when, according to the present invention, the inclination of the demister is adjustable. To said end, the invention provides that in the inlet region of the washer housing suitable probes check the dust content and the nature of the dust before varying the inclination of the demister either during operation or during breaks in operation. It goes without saying that variation of the inclination may also be advantageous when the dust quantity varies and varies noticeably over extended periods of time.

It was earlier pointed out that it is advantageous to dispose a jetwashing device upstream of the demister, wherein a precise influencing of the air stream is ensured by designing demister and jetwashing device so as to be jointly pivotal by means of a positioning motor. The jetwashing with water or alternatively with other liquids may therefore be effected always from the same angle, with the result that the cleaning effect in particular may be kept within the optimum range.

In order also to ensure a slewing or adjustment of the jetwashing device together with the demister without entailing problems with the water supply, the invention provides that the jetwashing device has a flexible water connection. Here, a piece of hose may be interposed or alternatively turning knuckles, which allow the jetwashing device to move back and forth relative to the corresponding connection pipe.

In the demister, dust-containing sludge water is extensively removed from the air stream. For said purpose, the demister has a suitable filling, wherein according to the invention it is provided that the demister is equipped with a sponge-like woven or braided steel filling. The air stream is repeatedly deflected by said woven steel material so that the sludge particles are acted upon accordingly and separated from the air by the impact energy. They are then carried along by the water and drain into the tank where the sludge separates from the water, thereby allowing the water to be recycled. As tests have demonstrated, said woven or braided steel material is eminently suitable for reliable collection of water drops carrying even superfine dust particles and their separation from the air stream.

Depending on the nature or condition of the dust, it is advantageous to add e.g. tension-relieving agents to the water. For said purpose, the invention provides that the water nozzles are disposed so as to project counter to the inflow direction of the dust-containing air and are connected to a supply pump, which is disposed between water nozzles and water tank and at the same time has an intake connection to an additional tank for water additives. First of all, the water nozzles by virtue of their clever arrangement ensure that the water droplets may bond very easily and reliably with the dust particles, wherein said bonding is improved by the water additives, i.e. for example, tension-relieving agents. The supply pump in said case removes the required quantity of water additives from the additional tank, mixes it simultaneously with the water and sprays said mixture counter to the air stream. An intimate bonding of the dust particles with the water is ensured and, with it, also a collection in the demister and a discharge from the air.

In the case of particularly tenacious dust which because of its origin or other influences is difficult to wet, it may be advantageous when, in addition to the water nozzles, further spray nozzles are arranged distributed over the flow path in the washer housing. In particular, said spray nozzles are connected in such a way that they simultaneously operate only when needed and otherwise remain inoperative.

The water removed from the air stream by the demister and the downstream units passes into the water tank and from there back into circulation. Naturally, a certain water loss is bound to occur and has to be replaced in the circuit. According to the invention, this is achieved in that the water tank comprises a float, which is designed so as to control the supply pump pipe and a valve disposed in the fresh water inlet. Said float may be used first of all e.g. to vary the inclination of the supply pump pipe so that further water may be removed from the water tank even when the water level drops. However, given a specific value, the float is used to activate the valve disposed in the fresh water inlet, which valve then ensures an intake of fresh water. Said design enables economic operation because fresh water is actually supplied only when further trouble-free operation would otherwise be no longer guaranteed.

It was already pointed out earlier that the water tank is designed in such a way that the separation of dust and water may be effected therein. In said case, however, it is ensured that only clean water is actually removed by the supply pump pipe by associating the float and pivotally arranged supply pump pipe with a chamber, which is separated from the rest of the water tank by a partition wall. This then offers precisely the possibility mentioned earlier, namely of swivelling the supply pump pipe in such a way that water may be removed over an extended period of time without fresh water having to be supplied. There is always clean water available in the chamber suitably separated off by the partition wall, even when at the other side of the partition wall there is still sludge-containing water or even a greater or smaller quantity of sludge.

Given a chamber separated in said manner, it is advantageous when the partition wall is connected to the tank base by a joint because there is then the possibility of swivelling the partition wall and hence allowing more or less water to flow into the separate chamber. The inclination of the partition wall may be swivelled e.g. in combination or in a corresponding manner with the supply pump pipe in order in said manner, as already mentioned, to enable the removal of clean water from the chamber.

Further units are disposed downstream of the demister in order to obtain air which is as dry as possible. In said case, the invention provides that a mist collector is disposed downstream of the demister and equipped with traps, which are disposed in the air stream in order to separate residual dust and above all water drops. The number of traps is high enough for the residual drops also to be always effectively caught and separated as the air stream winds accordingly around the traps, releases the drops but itself passes in a "dried" state out of the demister or out of the mist collector. Wear of said traps is prevented in that the traps in the form of baffle plates are coated with TEFLON, polytetrafluoroethylene. Thus, even given a continuous presence of residual moisture in the mist collector, it is ensured that long service lives are achievable. The Teflon even ultimately has the added advantage of promoting the precipitation of water or water drops. By Teflon is meant polytetrafluoroethylene.

The blades of the fan impeller rotate in the air stream, which carries along not only dust but also water or a mixture of both. To avoid overstressing of the blades, the invention provides that the blades of the fan impeller are made of highly wear-resistant steel and/or have a corresponding surface and/or coating. In said case, the surface should at the same time also be smooth enough to prevent sludge from collecting thereon. Because of the jetwashing of the air stream and hence ultimately also of the fan impellers, however, there is as a rule no baking-on of sludge.

Especially in underground mining, because of the deepness of the pits, the atmosphere, i.e. the air, has to be cooled. Operation of the mine air coolers is in said case adversely affected by the fact that air streams carrying a greater or lesser amount of dust flow into the mine air cooler, collect on the cooling pipes and hence impair the cooling effect. The mine air coolers therefore have to be cleaned at regular intervals, which is time-consuming and possible virtually only when the mine air coolers are stopped. Since the dust particles frequently bake hard on the cooling pipes, the effort required to detach them is occasionally quite considerable. According to the invention, it is now possible to equip the washer housing at the outlet side with a multi-purpose connection for a mine air cooler so that such a mine air cooler is connected directly to the dust separator. The mine air cooler therefore cools clean air, is virtually no longer subject to fouling and has a uniformly high cooling capacity and cooling effect because dust cannot settle on the cooling pipes. Thus, by virtue of such a combination of dust separator and mine air cooler, the occasionally considerable problems associated with the underground operation of mine air coolers are advantageously avoided.

A method of operating extracting plant at high temperatures, which is advantageously usable particularly in underground mining, provides that entrained dust is removed from the air immediately prior to cooling. Said preliminary cleaning of the air ensures a cooling operation of uniform quality because fouling of the used cooling pipes is ruled out. Furthermore, the air at the same time is also dried to such an extent that the formation of condensation water is reduced sufficiently for cooling of the air to be effected reliably and quickly.

The invention is notable for the fact that a dust separator in the form of a rotary washer is provided which, by virtue of its special construction and the units associated with it, enables operation with a stable characteristic and at the same time works with a high dust separation efficiency and relatively dry air. The air containing dust is taken in via a fan impeller disposed in the air stream, is already sprayed with water at the inlet of the washer housing and then freed of the sludge-containing water so that pure, clean air leaves the washer housing. The demister which separates the sludge-containing water is in said case so cleverly arranged and designed that it optimally performs its allocated task without the collected sludge leading to clogging of said unit. The sludge-containing water is fed to a water tank, wherein sludge and water are separated from one another and the clean water is then recycled. Recycling of the clean water is effected in such an automated manner that always only as much clean water or fresh water as is absolutely necessary need be supplied.

Where necessary, tension-relieving liquid or some other water additive is also added to the water by the supply pump in order to facilitate, speed up but at any rate ensure consolidation of the dust particles in the spray water.

Further details and advantages of the subject matter of the invention are evident from the following description of the accompanying drawings, in which a preferred embodiment with the requisite details and individual parts is illustrated. The drawings show:

BRIEF DESCRIPTION OF THE DRAWINGS

FIG. 1 a dust separator in side view, partially in section,

FIG. 2 a plan view of the outlet end of the dust separator and

FIG. 3 a side view of the outlet end with the water tank.

DETAILED DESCRIPTION

The dust separator 1 illustrated in side view in FIG. 1 is a so-called rotary washer. The dust-containing air is sucked by means of a fan impeller 6 into the washer housing 2, namely from the inlet side 3. The dust-containing air then passes through the washer housing from the inlet side 3 to the outlet side 4, wherein the fan impeller 6 with the blades 7 unlike the actual drive 5 lies in the air stream 21.

Disposed at the inlet side 3 is firstly a plurality of water nozzles 8, which spray water into the air counter to the inflow direction of said air in order to set the entrained dust. Here, in order to be able to operate with a uniform characteristic independently of the air quantity, the dust quantity and the remaining load, a gear unit 10 is associated with the drive 5. Said gear unit is shown by dashes in FIG. 1. It lies inside the washer housing 2 but at least in such a way as to be not visible.

Disposed downstream of the fan impeller 6 and the drive 5 in the washer housing 2 is one or more separating elements 11, by means of which the sludge-containing water is separated from the air and directed into the water tank 12.

FIG. 1 reveals that the demister 20 serving as a first separating element is positioned obliquely in the air stream 21 in order to facilitate outward passage of the sludge-containing water. What is not shown is that said demister 20 is pivotal about an axis (not shown) in such a way that it lies approximately horizontally in the air stream so that the collected sludge-containing water may easily and reliably drip downwards and be directed into the water tank 12.

The water tank 12 is provided with a water inlet or fresh water inlet 13 and a water outlet 14. Both or only the fresh water inlet 13 are controlled by means of the float 15, which moves up and down with the water level and in so doing, for example, opens or blocks fresh water inlet 13. The water outlet 14 or the supply pump pipe 33 is disposed in a pivotal manner to allow it to adapt to the rising or falling water level 18.

The sludge-containing water however passes first into the region disposed directly below the demister 20, wherein the sludge 17 may be removed via the drain valve 16 when sufficient sludge 17 has settled on the tank base 37. The tank base 37 is therefore disposed obliquely to allow the sludge 17 to slide automatically in the direction of the drain valve 16.

Disposed upstream of the demister 20 in the air stream 21 is a jetwashing device 22, by means of which the demister 20 may when necessary be charged with water in order to remove accumulated dirt. Although such an operation is as a rule required only at very long intervals because the oblique position or approximately horizontal arrangement of the demister 20 allows the sludge-containing water or the sludge to trickle downwards, the operating device 22 is necessary as a precaution. In said case, the inclination of the demister 20 and also of the jetwashing device 22 may be varied in each case by means of a positioning motor 23, i.e. in dependence upon the composition of the air and also upon moisture. Said swivelling of, in particular, also the jetwashing device 22 is easily possible because the jetwashing device 22 has a flexible or even pivotal water connection 24.

The demister 20 has a woven steel filling 25, which is merely indicated in FIG. 1. As a result of repeated deflection of the air stream, the dust-containing water is retained and may trickle down along the appropriate steel parts in order to be conveyed out of the washer housing 2. When the demister 20 is to be swivelled by means of the positioning motor 23, it is advantageous to dispense with the supporting feet 26, as shown in FIG. 1. The jetwashing device 22 and the demister 20 may then be swivelled about an axis, which is not visible here, into the horizontal or approximately into the horizontal.

Both the water nozzles 8 and the jetwashing device 22 are supplied by a supply pump 28 with jetwashing water from the water tank 12. In addition, the supply pump 28 is connected by a supply line 27 to an additional tank 29 in order where necessary to take in water additives from the latter and add them to the circuit to facilitate consolidation of the dust in the spray water. In the case of particularly tenacious dust, it may be necessary also to switch on the additional spray nozzles 31, 32 which are arranged distributed over the flow path 30. Said spray nozzles likewise spray counter to the air stream 21 and additionally ensure that a consolidation of the dust in the water drops is possible.

The flow path of the air stream enriched with sludge-containing water is denoted by 30. It is evident here that the flow path 30 passes around the drive 5 so that said component need not be disposed inside the washer housing 2 but may instead be disposed in a suitable recess or a suitable cavity so that the heat may be removed directly outwards.

It was already pointed out earlier that the water is conveyed as far as possible in the circuit and that only the naturally occurring loss is replaced with fresh water. In said case, the water is removed from the chamber 36 via the supply pump 28 and the supply pump pipe 33 and added to the circuit. The chamber 36 is separated from the rest of the water tank 12 by a partition wall 35 in order to ensure that said region does not silt up and also that the float 15 always retains its function. In said case, the partition wall 35 is pivotal by means of a joint 38 so that, where necessary, removal of water is still possible even with a dropping water level 18. The valve 34 in the fresh water supply line 13' is controlled by the float 15 and ensures that in each case only as much fresh water as is absolutely necessary flows into the water tank 12.

Downstream of the demister 20, which is illustrated also with regard to its insides in FIG. 1, a mist collector 40 is provided. Said mist collector 40 comprises a plurality of traps 41, 42, in which any water still carried along by the air is caught before then draining into the water tank 12.

FIG. 2 shows a plan view of the outlet side 4 of the washer housing 2, wherein it is clear from the traps 41, 42 that said purely mechanically operating unit ensures with the necessary certainty that the very last drops of water are extracted from the air stream 21.

Finally, FIG. 3 again shows the region of the outlet side 4 of the washer housing 2, namely in side view, wherein it is once more clear that the demister 20 is disposed so as to be steeply inclined until horizontal in the washer housing 2, while the mist collector 40 is positioned vertically therein. The sludge-containing water, which has drained into the water tank 12, arrives in a relatively large settling zone so that water and sludge may separate from one another. The water intended for further jetwashing passes over the partition wall 35 and into the region of the chamber 36, from which it may be removed by the supply pump 28 with the aid of the control system regulated by float 15.

The water connection 24 is to be flexible enough to participate in the motion of the jetwashing device 22 and the demister 20. Here, said water connection may comprise e.g. a piece of hose, which should additionally be telescopic in order not to impede the swivelling of demister 20 and jetwashing device 22.

The outlet side 4 of the washer housing 2 has a multi-purpose connection 45. Said multi-purpose connection 45 allows the connection of downstream cooling units, in particular of so-called mine air coolers used in underground mining. This has the enormous advantage that the mine air cooler only has to cool purified air or purified mine air, whereas in prior art the mine air always contains dust, which leads to clogging or at least however to a function-impairing coating on the cooling pipes.

Should it prove absolutely necessary for some reason, there is moreover the possibility of disposing both a second demister and a second mist collector in the housing, or in a downstream housing which may be connected thereto by the multi-purpose connection. This also increases the flexibility of such a device without entailing an excessively high capital expenditure.

All the described features, including the features inferrable from the drawings alone, are—on their own or in combination regarded as central to the invention.

What is claimed is:

1. Dust separator apparatus for dust-generating machines comprising a fan impeller, a washer housing having an inlet side and an outlet side, a drive acting upon the fan impeller disposed at the inlet side, water nozzles on the inlet side, a water tank including a valve-controlled water inlet, a water outlet and a drain valve for sludge, a gear unit communicating with the drive of the fan impeller being acted upon by a mixture of air, dust and water, and separating elements for dust-containing water disposed at the outlet side, wherein the separating elements comprise a demister having an adjustable inclination.

2. The apparatus of claim 1, wherein the inclination of the demister is generally horizontal to a stream of air.

3. The apparatus of claim 1, further comprising a jetwasher disposed upstream of the demister.

4. The apparatus of claim 1, wherein the demister comprises a spongy woven or braided steel filling.

5. The apparatus of claim 1, wherein the water nozzles project counter to an inflow direction of dust-containing air.

6. The apparatus of claim 5, further comprising a supply pump disposed between the water nozzles and the water tank.

7. The apparatus of claim 6, further comprising an additive tank, and an intake connecting the additive tank to the supply pump for adding additives.

8. The apparatus of claim 1, further comprising a flow path in the washer housing and spray nozzles distributed over the flow path.

9. The apparatus of claim 6, further comprising a float in the water tank for controlling a pipe of the supply pump, and a valve disposed in the water inlet.

10. The apparatus of claim 9, wherein the supply pump is pivotally disposed.

11. The apparatus of claim 10, further comprising a chamber separated from the water tank by a partition wall, wherein the supply pump pipe and the float are associated with the chamber.

12. The apparatus of claim 11, further comprising a joint connecting the partition wall to a base of the tank.

13. The apparatus of claim 2, further comprising a mist collector disposed downstream of the demister, the mist collector comprising traps disposed in the stream of air for separating residual dust and water drops.

14. The apparatus of claim 13, wherein the traps form baffle plates and have polytetrafluoroethylene coating.

15. The apparatus of claim 1, wherein the fan impeller comprises blades of wear-resistant steel.

16. The apparatus of claim 15, wherein the blades have a coating.

17. The apparatus of claim 1, further comprising a mine air cooler and a multi-purpose connection for connecting the mine air cooler to the washer housing at the outlet side.

18. The apparatus of claim 1, wherein the dust generating machines are in underground mining and tunnel construction.

19. Dust separator apparatus for dust-generating machines comprising a fan impeller, a washer housing having an inlet side and an outlet side, a drive acting upon the fan impeller disposed at the inlet side, water nozzles on the inlet side, a water tank including a valve-controlled water inlet, a water outlet and a drain valve for sludge, a gear unit communicating with the drive of the fan impeller being acted upon by a mixture of air, dust and water, and separating elements for dust-containing water disposed at the outlet side, a demister having an inclination and a positioning motor for pivotally connecting the demister and the jetwasher.

20. The apparatus of claim 19, wherein the jetwasher comprises a flexible water connection.

21. A dust separation method comprising operating extracting plants at high temperatures in underground mining and tunnel construction, directing hot, dust-containing air past cooling pipes, entraining dust and moisture from the air by separating elements, directing the air past demisters of the separating elements having inclinations adjustable to be horizontal to flow of the air, removing dust and moisture from the air immediately prior to cooling, and then cooling the air after removing dust and moisture.

* * * * *